Figure 1:
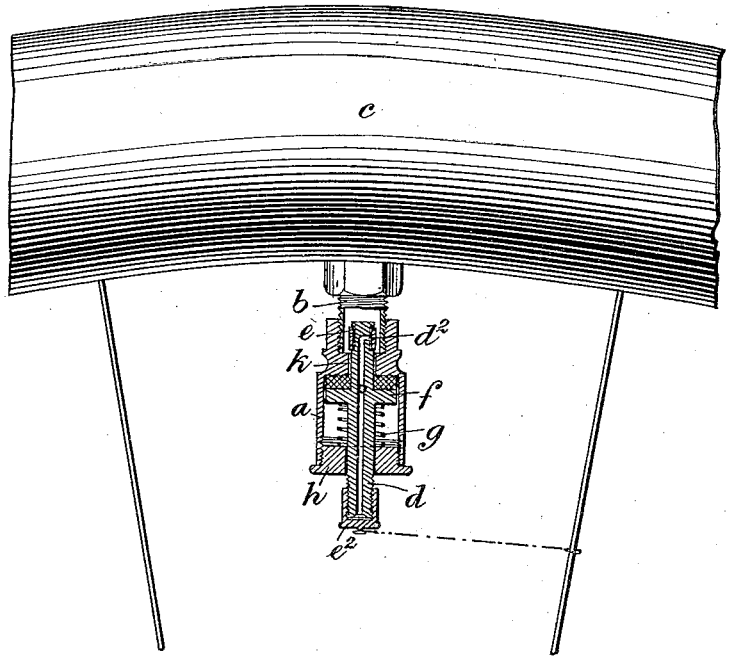

(No Model.) 3 Sheets—Sheet 1.

J. A. & H. A. LAMPLUGH.
COMBINED PRESSURE GAGE AND SAFETY VALVE FOR PNEUMATIC TIRES.

No. 511,706. Patented Dec. 26, 1893.

(No Model.) 3 Sheets—Sheet 2.

J. A. & H. A. LAMPLUGH.
COMBINED PRESSURE GAGE AND SAFETY VALVE FOR PNEUMATIC TIRES.

No. 511,706. Patented Dec. 26, 1893.

Witnesses:-
Richard Skerrett
Arthur John Powell

Inventors:-
James Alfred Lamplugh
Henry Arthur Lamplugh (No Model.) 3 Sheets—Sheet 3.

J. A. & H. A. LAMPLUGH.
COMBINED PRESSURE GAGE AND SAFETY VALVE FOR PNEUMATIC TIRES.

No. 511,706. Patented Dec. 26, 1893.

Witnesses:—
Richard Skerrett
Arthur John Powell

Inventors:—
James Alfred Lamplugh
Henry Arthur Lamplugh

United States Patent Office.

JAMES ALFRED LAMPLUGH AND HENRY ARTHUR LAMPLUGH, OF BIRMINGHAM, ENGLAND; SAID HENRY ARTHUR LAMPLUGH ASSIGNOR TO SAID JAMES ALFRED LAMPLUGH.

COMBINED PRESSURE-GAGE AND SAFETY-VALVE FOR PNEUMATIC TIRES.

SPECIFICATION forming part of Letters Patent No. 511,706, dated December 26, 1893.

Application filed May 17, 1893. Serial No. 474,579. (No model.)

*To all whom it may concern:*

Be it known that we, JAMES ALFRED LAMPLUGH and HENRY ARTHUR LAMPLUGH, both of Birmingham, England, subjects of the Queen of Great Britain, have invented a certain new or Improved Combined Pressure-Gage and Safety-Valve for the Inflated Tires of the Wheels of Bicycles, Tricycles, and other Velocipedes and Carriages; and we do hereby declare that the following is a full, clear, and exact description of the invention, which will enable others skilled in the art to which it appertains to make and use the same.

Our said invention consists of the construction and combination of parts hereinafter described constituting a new or improved combined pressure gage and safety valve, whereby the pressure of the air pumped into the inflated or pneumatic tires of bicycles, tricycles and other velocipedes can be determined at pleasure and the escape of air permitted if by accident or otherwise the pressure of the air in the tire momentarily exceed the arranged pressure. The injury to the tire which sometimes occurs by the incautious introduction of an excess of air or by the heating and consequent expansion of the air is thus prevented. We make a valve somewhat resembling the ordinary valve, that is, having a hollow stem to which the compressing pump is connected by a flexible pipe, the said hollow stem having a small side hole. The said stem is covered by a close fitting india rubber tube which constitutes an air admission valve opening inward, the india rubber being raised from the said side hole and allowing air to pass by the pressure of the air forced into the hollow stem by the pump. The said hollow stem is situated in a chamber or case communicating with the interior of the tire and the said chamber is provided with a valve seat on which the air admission valve carried by the hollow stem seats itself, being pressed to its seat by a coiled spring around the said stem. By means of a screw cap the said spring can be compressed to a greater or less degree and the valve pressed to its seat with greater or less force. The action of the parts is as follows: The india rubber tube constituting a valve opening inward, when the parts are in their normal position, closes the passage through which the compressed air passes to the tire; the valve on the hollow stem is pressed to its seat by the coiled spring. When air is pumped into the tire until it reaches the determined pressure any further introduction of air produces an increased pressure which raises the valve from its seat and permits the escape of the excess of air. If the air becomes heated or from any cause exceeds the adjusted pressure it similarly escapes. The pressure which it is wished the air in the tire shall not exceed is determined by screwing home more or less the cap which compresses the coiled spring holding down the valve and the parts may be graduated so as to indicate the adjusted pressure.

Figure 2:
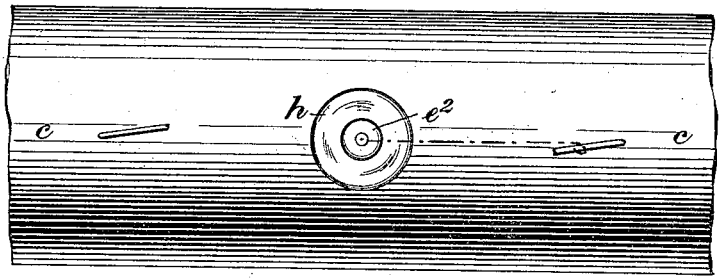
Figure 3:
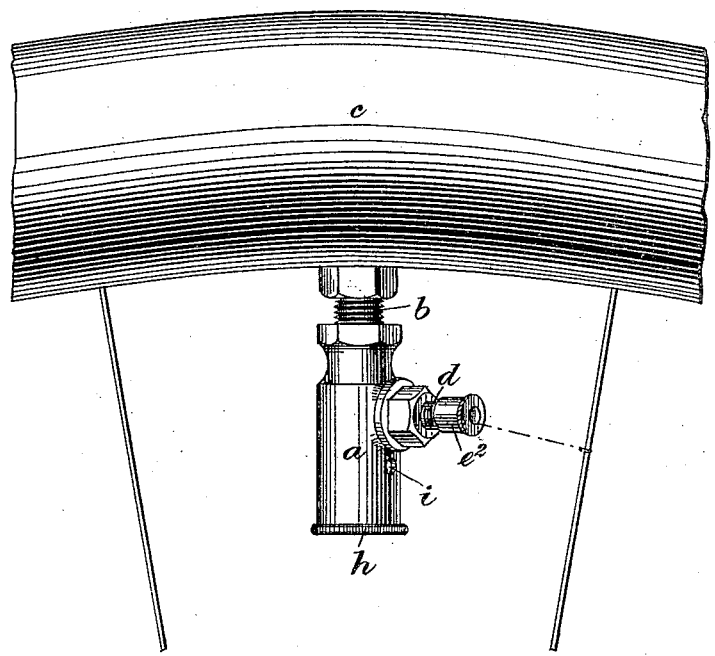
Figure 4:
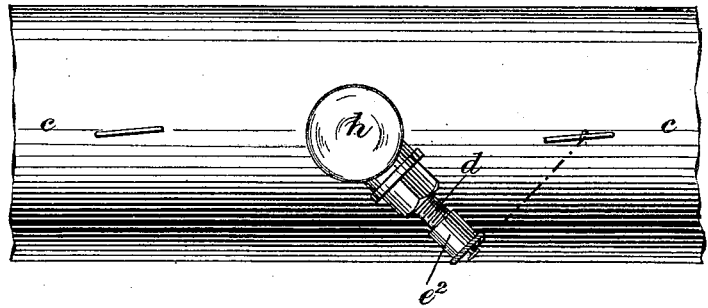
Figure 5:
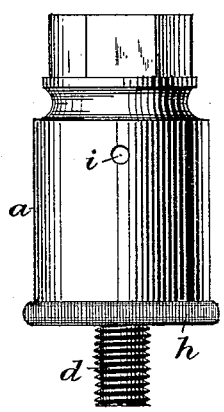
Figure 6:
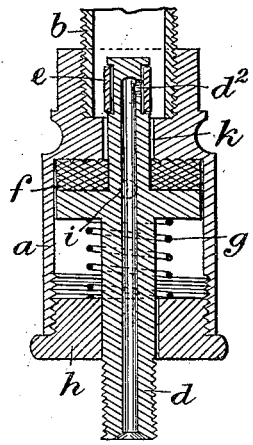
Figure 8:
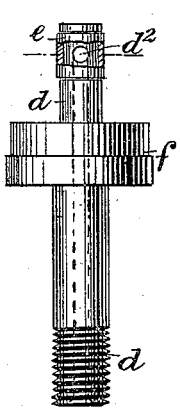
Figure 10:
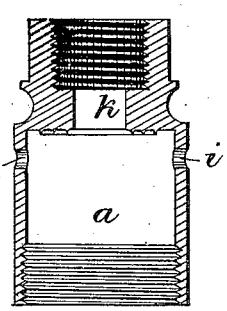
Figure 7:
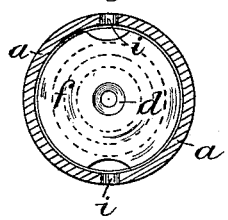
Figure 9:
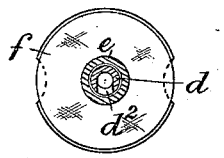
Figure 11:
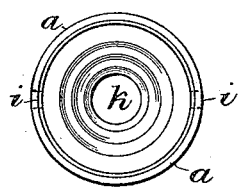
Figure 12:
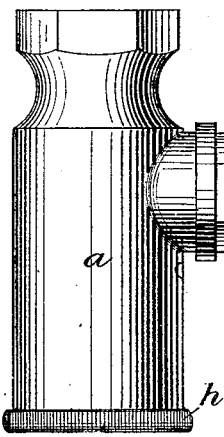

Figure 1 of the accompanying drawings represents in vertical section and Fig. 2 represents in plan, our new or improved combined pressure gage and safety valve in conjunction with an air admission valve, the apparatus being applied to the tire of a wheel for inflating the same. Fig. 3 represents in elevation and Fig. 4 in plan a modified arrangement in which the hollow stem to which the compressing pump is connected is situated at right angles to the axis of the case or chamber of the apparatus. The position of the hollow stem represented in Figs. 3 and 4 is more convenient for connecting the compressing pump than that represented in Figs. 1 and 2. Figs. 5, 6, 7, 8, 9, 10 and 11 represent, drawn to a larger scale, the apparatus represented in Figs. 1 and 2, Fig. 5 representing a side elevation; Fig. 6 a vertical section and Fig. 7 a horizontal section of the apparatus. Fig. 8 represents an elevation and Fig. 9 a horizontal section of the hollow stem and safety valve carried by it; and Fig. 10 represents a section and Fig. 11 a plan of the tubular case or chamber detached. Fig. 12 represents in elevation and Fig. 13 in vertical section, drawn to a larger scale, the apparatus represented in Figs. 3 and 4, and Fig. 14 represents in plan the hollow stem detached.

The same letters of reference indicate the same parts in the several figures of the drawings.

$a$ is the tubular case or chamber of the apparatus screwed to the ordinary hollow nipple $b$ in connection with the air tube of the pneumatic or inflated tire $c$ of the wheel.

$d$ is the hollow stem to the outer end of which the flexible tube of the compressing pump is screwed as usual, the said outer end of the stem being covered by the cap $e^2$. (See Figs. 1, 2, 3 and 4.) The hollow stem $d$ has at its inner end a small side hole $d^2$, which is covered by the air admission valve $e$ opening inward, the said valve $e$ consisting of a close fitting india rubber tube seating itself in a ring like depression in the inner end of the hollow stem $d$. (See Figs. 6 and 13.) When air is forced into the hollow stem $d$ by the compressing pump the valve or tube $e$ is raised from the side hole $d^2$ and air passes into the nipple $b$ and from thence into the air tube of the tire to be inflated.

The air admission valve $e$ constitutes no part of this invention and air admission valves of other kinds may be used in combination with this invention. In the case or chamber $a$, our combined pressure gage and safety valve is contained, the said combined gage and valve, consisting of a valve $f$ and screw cap $h$. The valve $f$ has its acting face covered with an india rubber disk which is pressed to the valve seat in the case or chamber $a$ by the coiled spring $g$. In the apparatus shown in Figs. 1 and 2 and the enlarged views of the same, the valve $f$ is carried by the hollow stem $d$, but in the modified apparatus Figs. 3 and 4 and the enlarged views of the same, the valve $f$ is independent of the hollow stem $d$. The bottom of the case or chamber $a$ is closed by the screw cap $h$ upon which one end of the coiled spring $g$ takes a bearing so that by screwing the said cap $h$ more or less into the case, the spring $g$ can be compressed to a greater or less degree and the valve $f$ pressed to its seat with greater or less force. Thus, the pressure which it is wished the air in the inflated tire shall not exceed, is determined by screwing home more or less the cap $h$ and compressing more or less the coiled spring $g$ holding the valve to its seat. In order to indicate the adjusted pressure, graduations may be made on the outside of the case $a$ and a pointer be fixed to the edge of the screw cap $h$. By the rotation of the cap in one or other direction its pointer can be brought to the required graduation on the case so as to adjust the spring to the pressure which it is desired the air in the tire shall attain before the excess of air can escape. Other ways of graduating may be employed. In place of the coiled spring represented for pressing and holding the valve $f$ to its seat, other kinds of springs, such as springs consisting of rods or pieces of vulcanized india rubber, may be employed and coiled or other springs of varying or graduated strength according to the pressure required in the tire may be used. In the case $a$ are holes or vents $i, i$ to permit of the escape of air when the valve $f$ is pressed from its seat. Between the upper part of the case $a$ and the lower part in which the valve $f$ works is an air way or passage $k$. In order that the india rubber disk or seating of the valve $f$ may make as perfect an air tight joint as possible it is preferred to form on the face of the valve seat in the case $a$ a series of fine concentric ribs or ridges. By the pressure of the coiled spring $g$, the valve disk or seating is pressed forcibly into the depressions or sunken parts between the said fine ribs or ridges and the passage of air between the fixed seat in the case and the india rubber seating or disk of the valve thereby effectually prevented.

Figure 13:
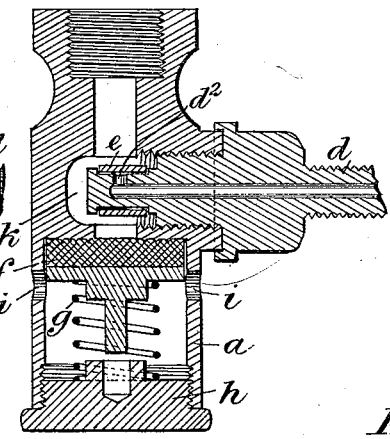
Figure 14:
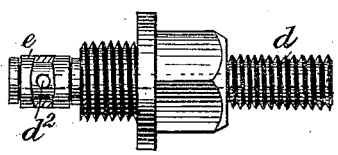

When the parts of the apparatus are in their normal positions as represented in Figs. 6 and 13 the air admission valve $e$ closes the passage through which the compressed air passes to the tire and the safety valve $f$ is pressed to its seat by the coiled spring $g$ and communication between the compressed air in the tire and the lower part of the case or chamber in which the valve works cut off. When air is pumped into the tire through the hollow stem $d$ and open valve $e$ until the air reaches the determined pressure, any further introduction of air produces an increased pressure which lifts the safety valve $f$ from its seat and permits of the escape of air by the passage $k$, open valve $f$ and vents or holes $i, i$ in the case. On the pressure of the air within the inflated tire being in this way reduced to the arranged pressure the spring $g$ again closes the valve $f$. The air similarly escapes should it by becoming heated exceed the adjusted pressure.

Having now particularly described and ascertained the nature of this invention and the manner in which the same is to be performed, we declare that we claim as our invention—

The combination with the air admission valve through which air is pumped into the pneumatic tires of the wheels of velocipedes and carriages, of a combined pressure gage and safety valve consisting of a case or chamber having a valve seat provided with a series of fine concentric annular ribs or ridges, a valve having its acting face covered with an india rubber disk adapted to be pressed into close engagement with the concentric ridges of the valve seat, a spring bearing on said valve to seat it, and an adjustable screw cap for compressing the spring and holding the valve to its seat with a predetermined pressure, substantially as and for the purpose described.

JAMES ALFRED LAMPLUGH. [L. S.]
HENRY ARTHUR LAMPLUGH. [L. S.]

Witnesses:
RICHARD SKERRETT,
ARTHUR JOHN POWELL.